(No Model.) 2 Sheets—Sheet 2.
W. ROGERS.
MACHINE FOR TURNING TENONS.
No. 404,113. Patented May 28, 1889.
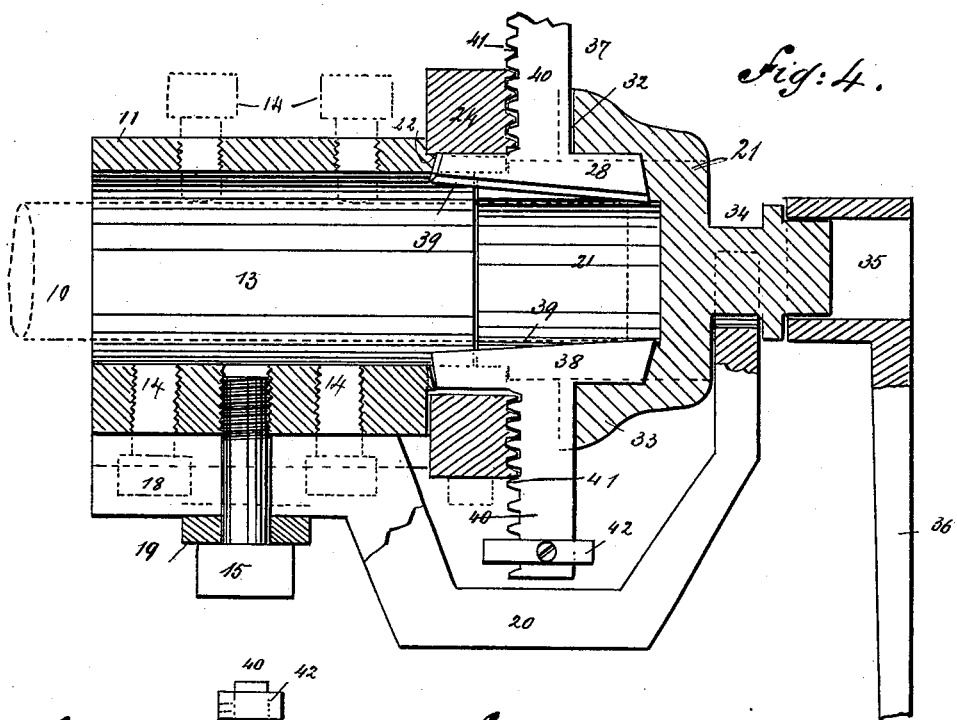
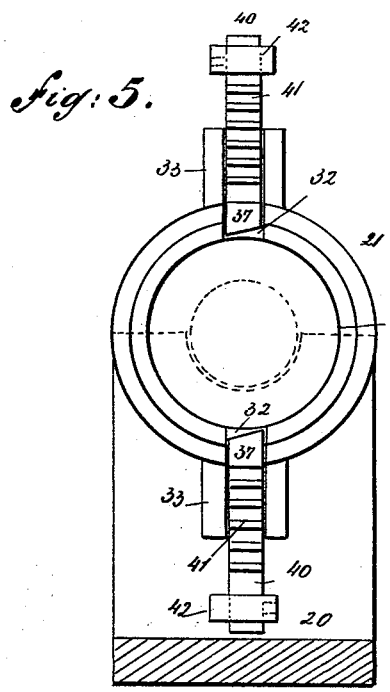
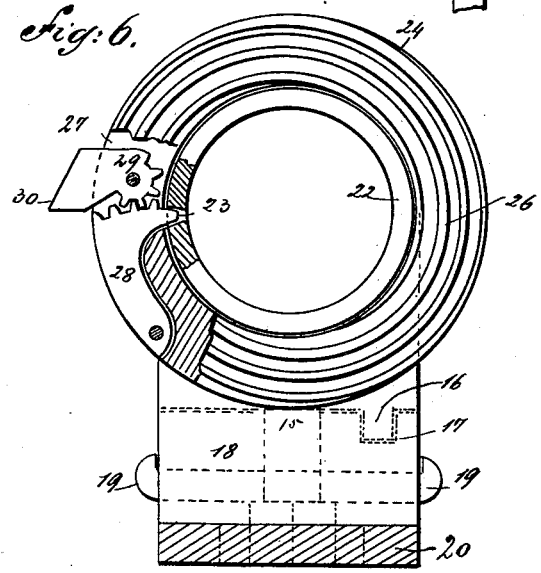
WITNESSES:
Chas. Nida
C. Sedgwick
INVENTOR:
W. Rogers
BY Munn & Co.
ATTORNEYS.

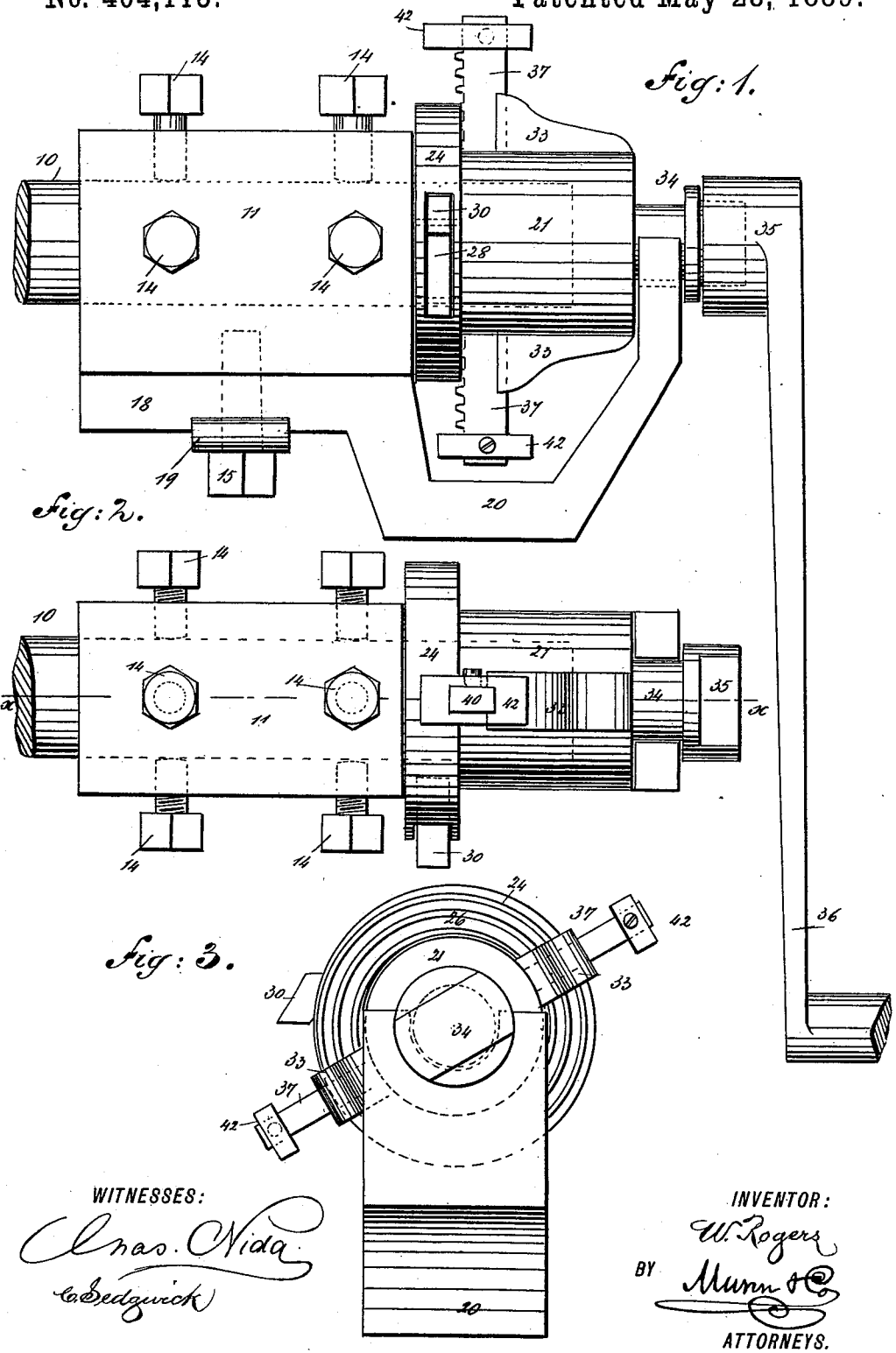

UNITED STATES PATENT OFFICE.

WILSON ROGERS, OF BARBOURSVILLE, WEST VIRGINIA.

MACHINE FOR TURNING TENONS.

SPECIFICATION forming part of Letters Patent No. 404,113, dated May 28, 1889.

Application filed October 24, 1888. Serial No. 289,013. (No model.)

*To all whom it may concern:*

Be it known that I, WILSON ROGERS, of Barboursville, in the county of Cabell and State of West Virginia, have invented a new and Improved Machine for Turning Tenons, of which the following is a full, clear, and exact description.

My invention relates to a machine for turning tenons, especially adapted for use in connection with vehicle-spokes, and has for its object to provide a machine of simple and durable construction capable of expeditious and convenient manipulation, whereby a tenon may be turned of any desired depth, and whereby also, when the predetermined depth of the tenon is reached, the cutters will be automatically released.

The invention consists in the novel construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1 is a side elevation of the device. Fig. 2 is a plan view of the same. Fig. 3 is a front elevation. Fig. 4 is a longitudinal vertical section taken partially on line $x$ $x$ of Fig. 2. Fig. 5 is an end view of the rotary cylinder, illustrating the application thereto of the cutters. Fig. 6 is a front elevation of the screw-ring and stationary casing, partly broken away, showing the ring locked upon the casing, and also illustrating the location of the locking and releasing device, the base being in transverse section; and Fig. 7 is a partial side elevation of a spoke having the tenon cut thereon.

The spoke 10, or other article upon which the tenon is to be produced, is passed through a stationary casing, 11, provided, preferably, with flat outer sides and a central cylindrical bore, 13. In the several sides and top of the casing 11 two spaced threaded apertures are preferably made, each adapted to receive a set-screw, 14, the inner ends of which set-screws are designed to engage with the sides of the spoke 10 and retain said spoke in a fixed position. In the bottom of the casing 11 three threaded apertures are formed, the two outer apertures being adapted for the reception of the set-screws 14, and in the central aperture a longer set-screw, 15, is entered, adapted for a purpose hereinafter set forth.

Upon the bottom of the casing 11 a longitudinal rib, 16, is attached to or cast integrally therewith, adapted to enter a groove, 17, in a base, 18. The base 18 is designed as a support for the casing 11, and to that end is provided with a central slot, through which the lower set-screws, 14 and 15, are passed. The set-screw 15 retains the casing in firm contact with the base 18, being provided with a binding-plate, 19, bearing upon the head of the set-screw, the ends of which plate are upturned to clamp the sides of the base, as best shown in Fig. 1.

At the inner end of the casing 11 the base 18 is stepped downward to form a yoke portion, 20, and carried upward to form a bearing for a rotary cylinder, 21, hereinafter described. The inner end of the casing 11 is provided with a circular reduced section, 22, as best illustrated in Fig. 6, and an aperture, 23, is produced in the said section at one side. A ring, 24, is fitted snugly upon the reduced section 22 of the fixed casing, the side of the ring in contact with the casing being plain and the opposite side provided with a screw-thread, 26, as best shown in Figs. 3 and 6. The ring 24 is provided with a recess, 27, in its periphery, in which recess a pawl, 28, is pivoted, adapted to enter the aperture 23 of the casing. The free end of the pawl 28 is toothed to engage with a pinion, 29, also pivoted in the recess 27, and the said pinion is provided with a lug or projection, 30, extending out beyond the periphery of the said ring 24, as best illustrated in Fig. 6.

The cylinder 21 above referred to is reduced at its inner end, 31, as shown in Fig. 5, to abut against the reduced section of the casing, and two or more slots, 32, are cut longitudinally in the cylinder 21 at the said reduced end 31, which slots extend through into the bore of the cylinder, and at the outer wall of the said slots a vertically-grooved stop-block, 33, is rigidly secured to the outer surface of the cylinder, as best illustrated in Figs. 1 and 4. If in practice it is found desirable, the stop-blocks and cylinder may be constructed of one piece. The cylinder 21 is provided at its outer end with a trunnion, 34, journaled in the upper end of the yoke 20 of base 18 in any approved manner. The extremity of the trunnion projecting beyond the bearing is preferably squared to receive the socket 35 of a crank-arm, 36.

The slots 32 in the cylinder 21 are adapted for the reception of cutters 37, the said cutters consisting of a blade, 38, located within the cylinder, and preferably provided with a tapering cutting-edge, 39, as best illustrated in Figs. 4 and 5. From the upper or outer surface of the blades 38 a straight shank, 40, is projected, having teeth formed transversely in one edge, as illustrated at 41 in Figs. 4 and 5, which teeth are adapted to mesh with the thread 26 upon the ring 24. A trip-block, 42, is held to slide upon the shank 40 of the cutters, and is retained in connection therewith at any point in the length of the shank through the medium of a set-screw or equivalent fastening device.

In operation the set-screw 15 is loosened and the base-plate 18 is slid to the right. The cutters 37 are then raised, the spoke introduced into the casing and secured, and the cylinder introduced into the casing so that the shank of the cutters will be brought in contact with the threaded surface of the ring 24. The trip-block 42 is then secured upon the shank of the cutters at a suitable point to regulate the depth of the tenon. The crank-arm 36 is now revolved and the cutters fed down by the contact of their shanks with the ring 24. When the predetermined depth of the tenon has been reached, as the cylinder 21 revolves, the trip-block 42 will be brought in contact with the projection 30 of the pinion 29, whereby the said pinion is partially rotated and the pawl 28 lifted from engagement with the reduced surface of the casing. The cylinder and ring being locked together by the engagement of the threaded surface of the ring with the teeth of the cutter-shanks, they will revolve together and the cutters will be fed no farther downward.

Having thus described my invention, I claim as new and desire to secure by Letters Patent—

1. The combination, with a fixed casing provided with a tubular bore, a ring having one threaded face and attached to said casing, and a releasing device pivoted in the said ring, of a rotary cylinder, blades held within the cylinder provided with a toothed shank engaging the threaded surface of the ring, and means, substantially as shown and described, for rotating the said cylinder, as and for the purpose specified.

2. The combination, with a fixed casing provided with a central bore, and set-screws passing through to the interior of the casing, a ring secured to one end of said casing having one threaded face, and a releasing device pivoted within the ring, of a rotary cylinder, blades held within said cylinder provided with a toothed shank engaging with the threaded surface of the ring, and trip-blocks detachably secured to said shank, substantially as and for the purpose specified.

3. The combination, with a fixed casing provided with a central longitudinal bore, set-screws passing through the casing to the interior thereof, a ring secured to one end of the casing and having one threaded face, a toothed pawl pivoted within the ring engaging with the casing, and a pinion engaging with said pawl and provided with an outwardly-extending lug, of a rotary cylinder, blades loosely held within the cylinder, toothed shanks attached to said blades engaging the threaded surface of the ring, trip-blocks adjustably secured upon said shanks adapted to limit the movement of the blades, and means, substantially as shown and described, for rotating the cylinder, as and for the purpose specified.

4. The combination, with a base provided with an intermediate yoke-section and an upwardly-extending arm at one extremity, a casing provided with a central bore supported by said base, set-screws passing through said casing to the interior thereof, a binding-plate clamping at under side of the base beneath the casing, and a set-screw passing through the clamping-plate and base into the casing, of a ring secured at one end of the casing having one threaded face, a toothed pawl pivoted in the ring engaging the casing, a pinion meshing with the pawl provided with an outwardly-extending lug, a cylinder journaled upon the arm of the base abutting with the fixed casing, blades adjustably held in the cylinder, toothed shanks integral with said blades, a trip-block adjustably secured upon each shank, and means, substantially as shown and described, for rotating the cylinder, as and for the purpose specified.

WILSON ROGERS.

Witnesses:
GEO. E. THORNBURG,
M. S. THORNBURG.